(12) United States Patent
Hong et al.

(10) Patent No.: US 6,337,984 B1
(45) Date of Patent: Jan. 8, 2002

(54) METHOD FOR CONTROLLING A HANDOFF IN A COMMUNICATION SYSTEM

(75) Inventors: Sung Hyuck Hong, Kyungki-do; Hyun Goo Lee, Seoul; Ja Hyeok Yoon, Kyungki-do, all of (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/223,733

(22) Filed: Dec. 31, 1998

(30) Foreign Application Priority Data

Nov. 4, 1998 (KR) ............................................. 98-47190

(51) Int. Cl.[7] .............................. H04Q 7/20; H04Q 7/00
(52) U.S. Cl. ........................ 455/439; 455/437; 370/332
(58) Field of Search ................................ 455/436, 437, 455/438, 439, 440, 442; 370/332, 333, 335, 331

(56) References Cited

U.S. PATENT DOCUMENTS

| | | | | |
|---|---|---|---|---|
| 5,117,502 A | * | 5/1992 | Onoda et al. ................ | 455/437 |
| 5,267,261 A | * | 11/1993 | Blakeney, II et al. ....... | 370/332 |
| 5,732,347 A | * | 3/1998 | Bartle et al. ................ | 455/421 |
| 5,812,540 A | * | 9/1998 | Bruckert et al. ............ | 370/332 |
| 5,848,063 A | * | 12/1998 | Weaver, Jr. et al. ........ | 370/331 |
| 5,862,453 A | * | 1/1999 | Love et al. .................... | 455/69 |
| 5,870,666 A | * | 2/1999 | Tanaka et al. ............. | 455/67.1 |
| 5,884,187 A | * | 3/1999 | Ziv et al. .................... | 455/522 |
| 5,930,242 A | * | 7/1999 | Mimura ...................... | 370/331 |
| 5,978,365 A | * | 11/1999 | Yi ................................ | 370/331 |
| 5,987,326 A | * | 11/1999 | Tiedemann, Jr. et al. ... | 455/442 |
| 6,021,328 A | * | 2/2000 | Curtis et al. ................ | 455/443 |
| 6,035,197 A | * | 3/2000 | Haberman et al. .......... | 455/439 |
| 6,049,716 A | * | 4/2000 | Jung .......................... | 455/442 |
| 6,055,428 A | * | 4/2000 | Soliman ..................... | 455/437 |
| 6,072,778 A | * | 6/2000 | Labedz et al. .............. | 370/252 |
| 6,072,790 A | * | 6/2000 | Neumiller et al. .......... | 370/338 |
| 6,073,025 A | * | 6/2000 | Chheda et al. ............. | 455/522 |
| 6,181,738 B1 | * | 1/2001 | Chheda et al. ............. | 375/224 |

\* cited by examiner

*Primary Examiner*—Vivian Chang
*Assistant Examiner*—Charles N. Appiah
(74) *Attorney, Agent, or Firm*—Fleshner & Kim, LLP

(57) ABSTRACT

The present invention is to provide a method for controlling a handoff in a communication system. The pilot strength of a base station and the frame quality of a forward link are measured by a mobile station. The mobile station checks whether the measured pilot strength is higher than a parameter (T-ADD) that is a threshold value for the pilot strength of the base station to which a new communication path is supposed to be added. Furthermore, it is checked whether or not the measured frame quality of the forward link is good as compared with a preset parameter (T_QUALITY). It is also checked whether or not the measured pilot strength is higher than the T_PRANKth strength of the pilots of the currently active base stations. The mobile station sends a pilot strength measurement message (PSMM) to a handoff control system in order to establish a new communication path through the base station according to the above checking results.

22 Claims, 6 Drawing Sheets

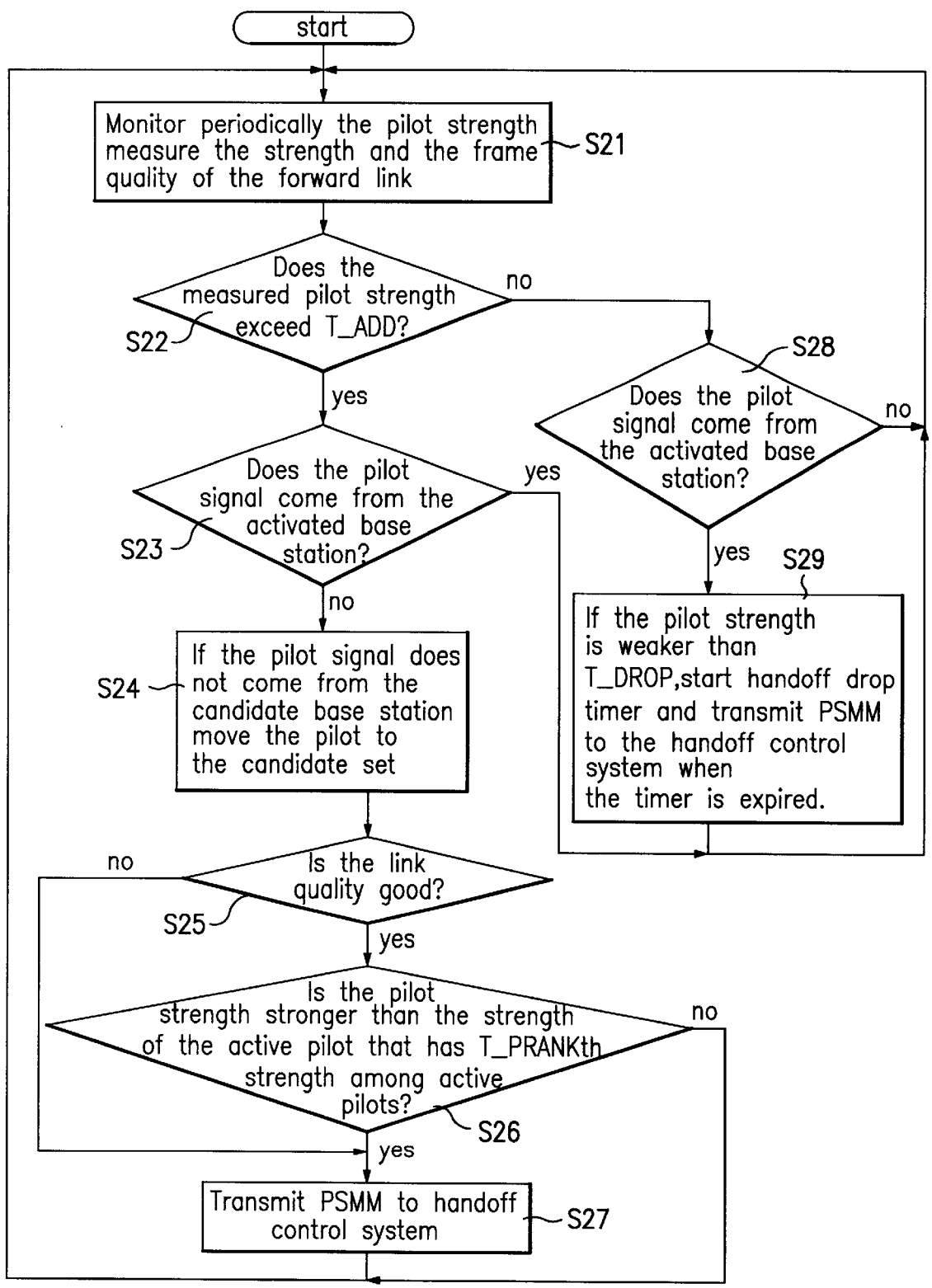

METHOD FOR CONTROLLING A HANDOFF IN A COMMUNICATION SYSTEM

BACKGROUND OF THE INVENTION

1. Field of Invention

The present invention relates to a mobile communication system, more particularly, to a method for controlling a handoff in a mobile communication system so that its call quality and capacity are improved.

2. Background of the Related Art

In the mobile communication system using a code division multiple access (CDMA), some unnecessary handoffs emerge and then deteriorate the call quality. Therefore, a control method for the handoffs is required.

Generally, in order to keep the movability and the continuity of the communication in the CDMA mobile communication system, soft handoff or softer handoff has been used. The soft and softer handoffs are the mobile assisted handoff (MAHO) method based on the information that a mobile station provides. These soft and softer handoff methods consist of the process that the mobile station reports the information about the pilot signal strength of the base station and the process that the handoff control system (that is, a base station and a base station controller) performs the wireless channel resource assignment and release based on the information of the pilot signal strength of the base station.

During communicating a mobile station measures periodically the pilot signal strength of the active base set with which active communication path is established and the pilot signal strength of the candidate base station or the neighbor (or remaining) base station. If the measured pilot signal strength satisfied the handoff condition provided from the handoff control system, the mobile station attaches the corresponding measured result to a pilot strength measurement message (PSMM) and then sends the PSMM to the handoff control system. The handoff control system received the PSMM from the mobile station adds a new traffic path or drops the existing traffic path according to the strength information of the pilot signal included in the received PSMM.

Generally, the elements that is used by the mobile station to trigger the handoff are four parameters (T_ADD, T_DROP, T_COMP, T_TDROP). The parameter (T_ADD) is the threshold value of the pilot strength for the base station which is to be added to the traffic path. The parameter (T_COMP) is used for the additional generation of the PSMM. In other words, if the pilot signal strength of a base station which is measured by a mobile station is over the parameter (T_ADD), the mobile station reports the fact to the handoff control system through the PSMM. However, if the communication to the base station has not yet been established, the base station is managed as the candidate base station. The parameter (T_COMP) is used for the additional generation of the PSMM. On the other hand, the parameter (T_DROP) denotes the release condition for the currently active communication path and is the threshold value of the pilot signal strength to the base station which belongs to the communication path to be released. The parameter (T_TDROP) denotes the time threshold value which is the maximum strength of the pilot signal of the base station until the time just before the communication path presently established is released.

The conventional soft and softer handoff processes is explained by referring to FIGS. 1 and 2.

FIG. 1 is a diagram showing the pilot signal strength change of an arbitrary base station which is monitored, during communicating, by a active mobile station and the event according to the change. Referring to FIG. 1, the establishment and release of a new communication path between an arbitrary base station and a mobile station is explained.

First, referring to the time a1 in FIG. 1, since the presently measured strength of the pilot signal of a base station exceeds the parameter (T_ADD), the corresponding mobile station sends the PSMM to the handoff control system and moves the corresponding pilot from the neighbor set to the candidate set.

At the time a2 of FIG. 1, the handoff control system sends the mobile station the handoff direction message to establish a communication path with the corresponding base station. At the time a3 of FIG. 1, the mobile station receives the handoff direction message and moves the pilot of the corresponding base station from the candidate set to the active set and establishes a communication path with the corresponding base station. After then, the mobile station sends the handoff completion message to the handoff control system (Soft/Softer Add process).

However, at the time a4 in FIG. 1, if the measured strength of the pilot signal of the corresponding base station is smaller than the parameter (T_DROP), the mobile station transfers the value of the parameter (T_TDROP) into the handoff drop timer and then drives the timer. At the time a5 in FIG. 1, if the timer stops, the mobile station transmits the PSMM to the handoff control system.

Then, at the time a6 in FIG. 1, the handoff control system sends the mobile station the handoff direction message that is to release the communication path with the corresponding base station.

The mobile station, as shown at the time a7 in FIG. 1, moves the pilot of the corresponding base station from the active set to the neighbor set. In other words, the existing communication path with the corresponding base station is released and the mobile station sends the handoff control system the handoff completion message (Soft/Softer Drop process).

As described beforehand, a handoff starts by a mobile station. FIG. 2 is a diagram showing the PSMM generation condition according to the pilot of a candidate set. Therefore, FIG. 2 shows the condition for generating another PSMM when any response from the handoff control system or the direction to establish a communication path to the corresponding base station is not received after the mobile station sends the handoff control system the PSMM to add a new communication path. In other words, FIG. 2 shows the PSMM generation condition for a pilot when the pilot moves from the neighbor set to a candidate set but does not further move to an active set.

In FIG. 2, P0 is the strength of the pilot of the candidate base station. P1 and P2 are the strength of the pilot of the currently active base stations which have the communication path with a mobile station, respectively.

At the time t0 in FIG. 2, since P0 exceeds the parameter (T_ADD), the mobile station sends the handoff control system the PSMM for the pilot ol the candidate base station. At the time t1 in FIG. 2, since P0 is larger than P1 by the value (T_COMPx 0.5 dB), the mobile station sends the handoff control system the PSMM of the pilot of the candidate base station. At the time t2 in FIG. 2, since P0 is larger than P2 by the value (T_COMP×0.5 dB), the mobile station sends the handoff control system the PSMM of the pilot of the candidate base station.

However, the conventional handoff method described above has the following problems.

First, in the process determining the necessity of the handoff, the conventional handoff method uses the strength of the pilot of the base station as a criterion. However, if only the pilot strength of a base station is used for the criterion, in the midtown circumstances in which the propagation situation is changed rapidly and widely according to the movement of the mobile station or to the changes of the surrounding interferences, the unnecessary handoffs that deteriorates the call quality and the system performance may be caused.

For example, if the pilot strength of a base station exceeds temporarily the parameter (T_ADD), the handoff can be caused. And, the communication path between the mobile station and the corresponding base station will be established. But, the established communication path will not serve as a real communication path and be released soon. The signaling between the handoff control system and the mobile station for the handoff does not have any meaning. But, the signaling deteriorates the call quality and increases the load of the communication system. Furthermore, the established communication path becomes only an interference to other subscribers.

Second, another communication path except the existing path is added and therefrom the diversity gain for the call can be increased. However, the diversity gain may be increased only in the case that the added path maintains the quality higher than a certain level. Particularly, if the existing established communication path maintains the enough quality, the diversity gain is not improved by adding a new communication path. In the CDMA mobile communication system, since adding a new communication path is equivalent to adding a new call in view of the forward link, adding a new communication path cases the system capacity drop in the case of the existing communication path with a good quality.

Third, if the average number of the communication paths which are established for a single call is higher than need, it mean that the hardware resources of the base station is wasted as much.

Therefore, those handoffs become the interference even to other subscriber and decrease the total system capacity.

SUMMARY OF THE INVENTION

Accordingly, the present invention is directed to provide a method for controlling a handoff in a mobile communication system by which unnecessary handoff is suppressed.

To achieve this and other advantages and in accordance with the purpose of the present invention, as embodied and broadly described, the handoff controlling method uses, as the criterion elements for determining the necessity of the handoff, the pilot strength of the base stations as well as the information about the frame quality of the forward link (FER, BER, SER, etc.). As the other criterion elements, one of the pilot strengths of the currently active base stations is used as a relative threshold value to the pilot strengths of the other base stations each of which is to be a new active base station.

According to the present invention, the pilot strength of a base station and the frame quality of the forward link are measured by a motile station. The mobile station checks whether the measured pilot strength is higher than the parameter (T_ADD) that is a threshold value to the pilot strength of a base station to add a new communication path. It is checked whether the frame quality of the forward link is good based on the preset parameter (T_QUALITY). It is also checked whether the measured pilot strength is higher than the strength of the pilot in the active set that has T-PRANKth strength among active pilots. The mobile station sends the handoff control system the PSMM in order to establish a new communication path by using the base station according to the checked results.

On the other hand, as the checked results, if the frame quality of the forward link is good based on said parameter (T_QUALITY) but the measured pilot strength is higher than the parameters (T_ADD, T_PRANK), the mobile station sends the PSMM to the handoff control system.

However, even if the frame quality of the forward link is not good based on said parameter (T_QUALITY) but the measured pilot strength is higher than the parameters (T_ADD, T_PRANK), the mobile station can send the PSMM to the handoff control system.

Thus, according to the present invention, the unnecessary handoffs are reduced. Furthermore, the capability of the total mobile communication system is increased. The frequent repeat of the communication path add and drop is reduced and therefore the interference effects to other subscribers are prohibited. Since the frequent signaling between the mobile station and the handoff control system is prohibited, the deterioration of the call quality is prohibited and therefore the load of the mobile communication system is reduced.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 6 is a flow chart for performing the soft and softer handoff methods by using the parameters T_QUALITY and T_PRANK according to the present invention.

DETAILED DESCRIPTION OF THE PREFERRED EMBODIMENT

Reference will now be made in detail to the preferred embodiments of the present invention, examples of which are illustrated in the accompanying drawings.

The handoff process according to the present invention, as the conventional handoff process, also consists of the process that the mobile station reports the information of the pilot strength of the base station and the process that the wireless channel resource assignment and release are performed by the handoff control system based on the reported information.

As described beforehand, according to the present invention when a communication path add (Soft/Softer Add process) is performed by the conventional soft/softer handoff methods, the frame quality of the forward link in addition to the strength of the pilot of the base station is considered as the criterion elements for establishing the additional communication path.

Therefore, in the present invention., the parameters (T_ADD, T_DROP, T_TDROP) that are identical to the other parameters of the conventional handoff method except the parameter (T_COMP) are used as they are. In addition to them, the parameters defined as following are used. All the parameters are provided from the handoff control system to the mobile station.

Parameter T_QUALITY: This denotes the threshold value of the forward link frame quality (Frame Error Rate:FER, Bit Error Rate:BER, Symbol Error Rate:SER) that must be considered when the PSMM to adding a communication path is sent.

Parameter T_PRANK: This parameter must be considered when the PSMM to adding a communication path is sent. This denotes the threshold value that is relatively satisfied by comparing the pilot strength of the newly added active base station with the pilot strength of one or more currently active base stations. The application of the parameters (T_QUALITY, T_PRANK) are decided by the communication network operator.

Parameter L_QMFRAMES: This is a period that measures the frame quality of the forward link by a mobile station.

Referring to FIGS. 3 to 6, the process of the additional establishment of a communication path according to the present invention is explained.

Figure 1:
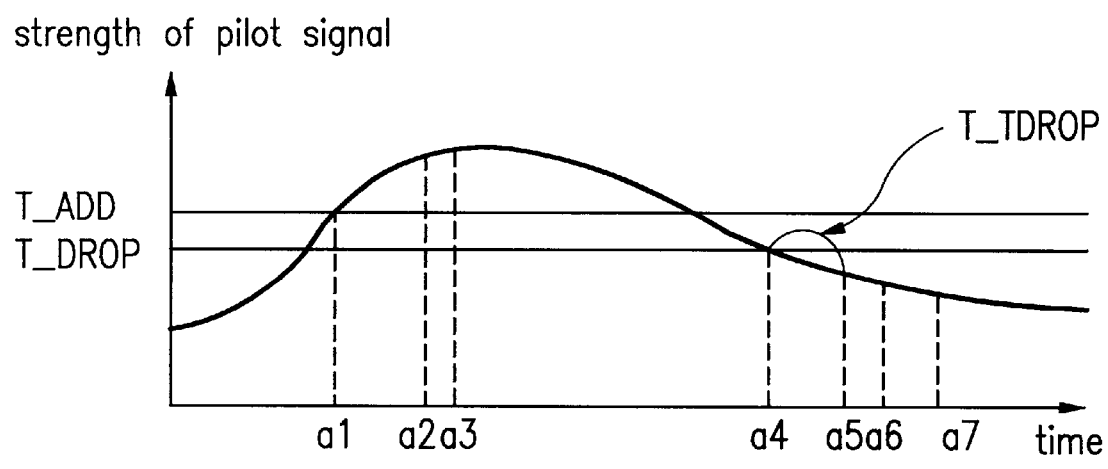
FIG. 1 is a diagram showing the pilot strength change of an arbitrary base station which is monitored by a busy mobile station and the event according to the change.
Figure 1:
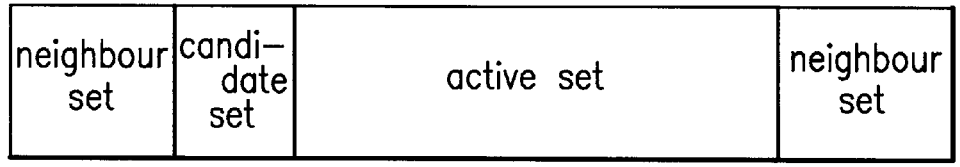
Figure 2:
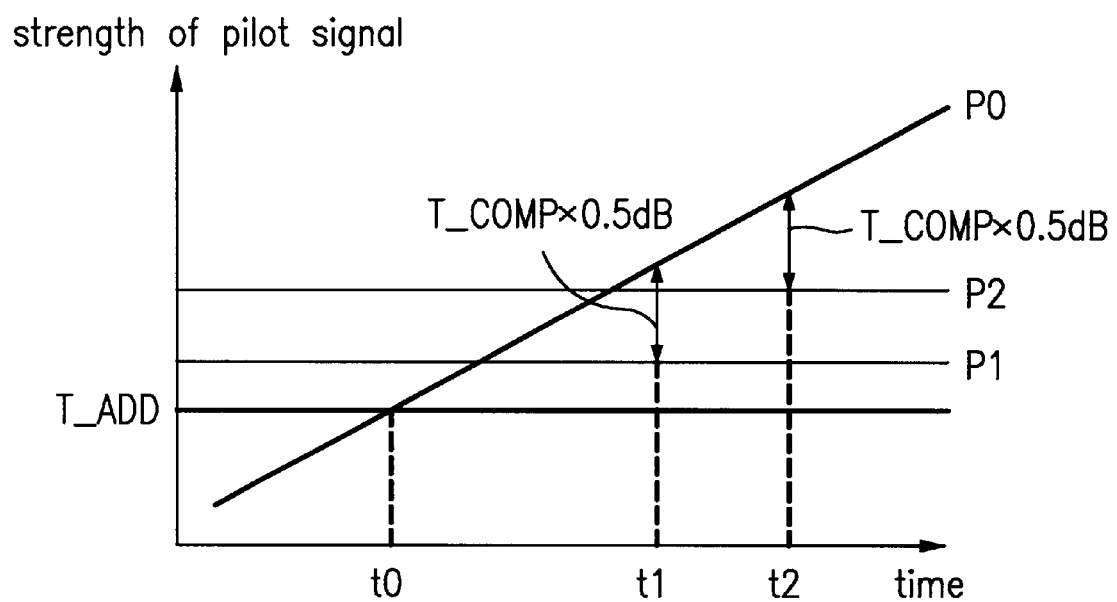
FIG. 2 is a diagram to explain the PSMM generation condition in a conventional handoff method.
Figure 3:
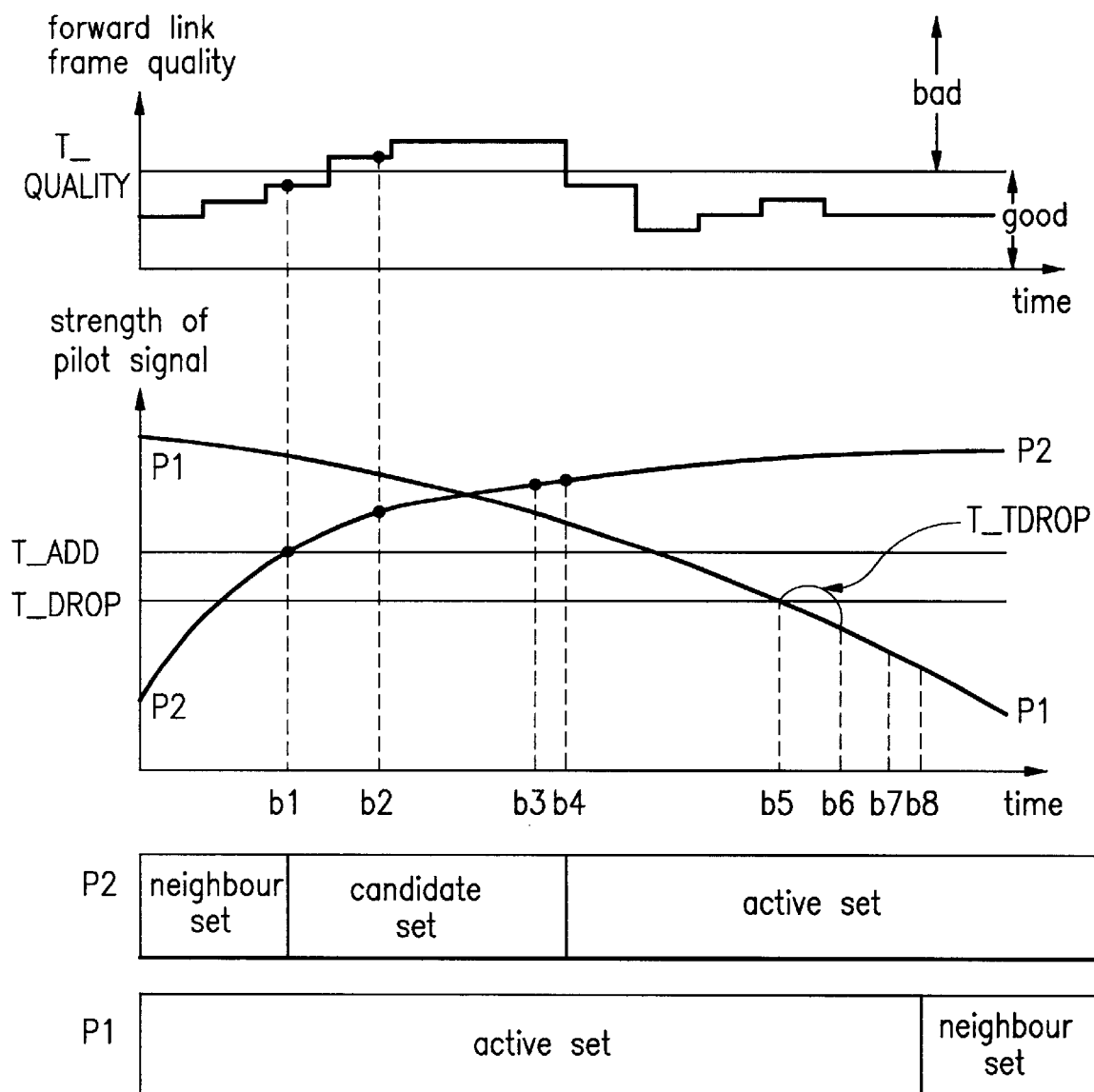
FIG. 3 is a diagram to explain the soft and softer handoff methods using the parameters T_ADD, T_DROP, T_TDROP and T_QUALITY according to the present invention.

FIG. 3 is a diagram to explain the soft and softer handoff methods using the parameters (T_ADD, T_DROP, T_TDROP, T_QUALITY) according to the first exemplary embodiment of the present invention.

In FIG. 3, the handoff decision by the parameter (T_PRANK) is not considered.

Figure 4:
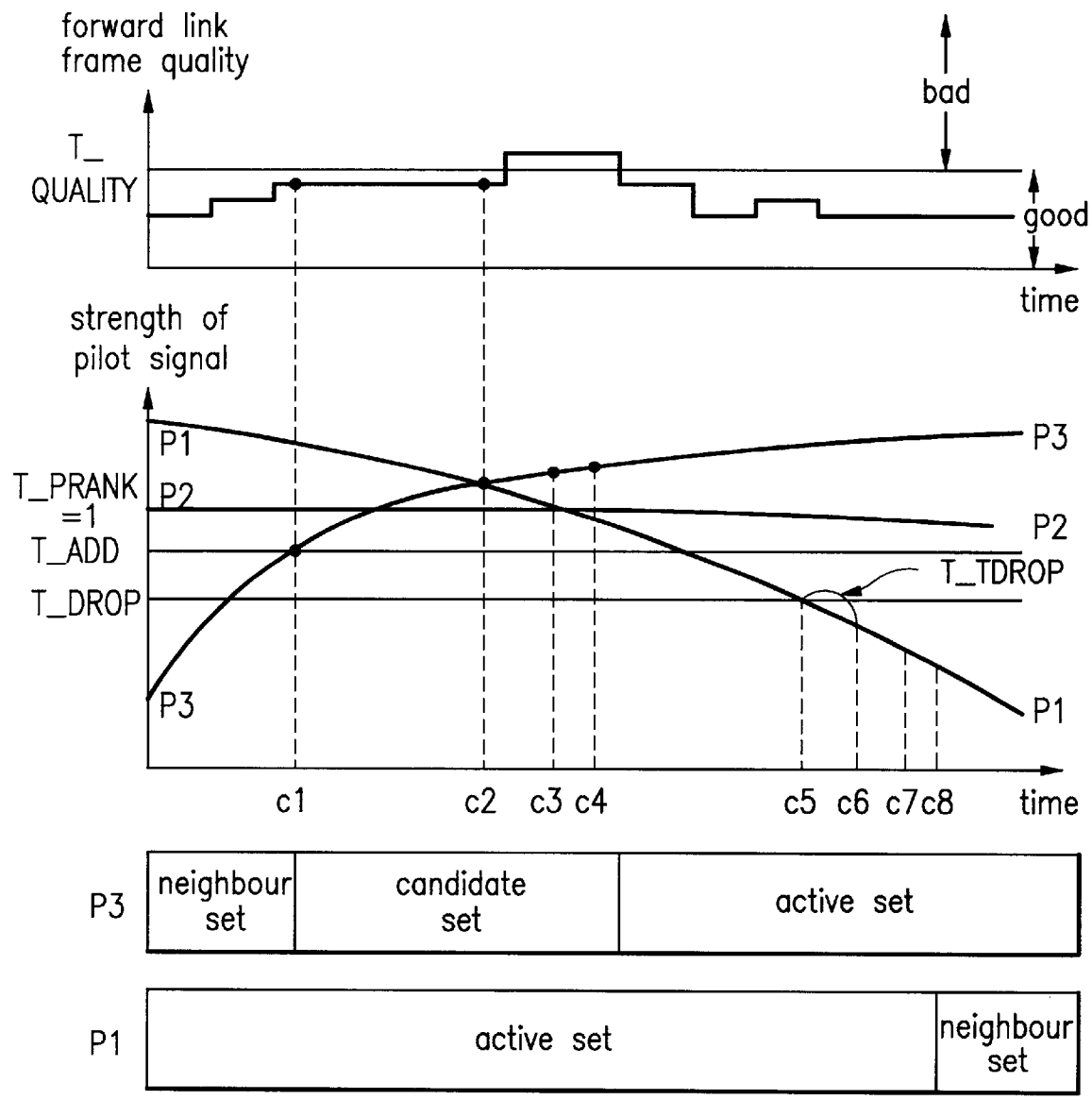
FIG. 4 is a diagram to explain the soft and softer handoff methods using the parameters T_ADD, T_DROP, T_TDROP, T_QUALITY and T_PRANK according to the present invention.

FIG. 4 is a diagram to explain the soft and softer handoff methods using the parameters (T_ADD, T_DROP, T_TDROP, T_QUALITY and T_PRANK ) according to the second exemplary embodiment of the present invention.

In FIG. 4, the parameter (T_QUALITY) together with the parameter (T_PRANK) are considered for the handoff decision.

In FIG. 3, the parameter (T_QUALITY) about the frame quality of the forward link means that of the currently active base station being used now. This frame quality is measured by the mobile station. P1 denotes the pilot strength of the base station and of the currently active base station. P2 denotes the pilot strength of the base station and of a newly added active base station. FIG. 3 is explained in the view of the newly added active base station.

At the time b1, since P2 exceeds the parameter (T-ADD), the PSMM is transmitted from the mobile station to the handoff control system according to the conventional method. However, in the present invention, the frame quality of the forward link being currently used must be considered. At the time b1 in FIG. 3, the frame quality of the forward link is good. Therefore, the mobile station does not send the PSMM to add a new base station to the handoff control system. At the time b2 in FIG. 3, the frame quality of the forward link is not good while the pilot strength (P2) of the base station (P2) to be newly added exceeds the parameter (T-ADD), the mobile station sends the handoff control system the PSMM to add the P2. At the time b3, the handoff control system sends the mobile station the handoff direction message. At the time b4, the mobile station establishes the communication path with the candidate base station (P2) and sends the handoff completion message to the handoff control system. Therefore, the candidate base station (P2) becomes a new active base station. On the other hand, in FIG. 3, the process that the active base station (P1) being currently used transits to a neighbor base station is the same as the conventional one and therefore the explanation is omitted. The only stressed one thing is that though the pilot strength of the currently using base station decreases smaller than the parameter (T-DROP), in order for the active base station to be transited completely to the neighbor base station, the pilot strength must be maintained at the value less than T-DROP while the time corresponding to the parameter (T-TDROP) passes since the strength equals the parameter (T-DROP).

Referring FIG. 4, the second exemplary embodiment according to the present invention is explained.

In FIG. 4, the frame quality of the forward link is the same as the currently using active base station and is measured by the mobile station. In FIG. 4, P1 and P2 denote the pilot strength of the currently using first and second active base stations, respectively, P3 denotes the pilot strength of the third base station to be an active base station. On the other hand, in FIG. 4, the parameters (T_PRANK. T_ADD, TDROP, T_TDROP) are the values to be sent down from the handoff control system to the mobile station. The P1 is to show the process that the existing active base station becomes the neighbor base station. The P3 is to show the process that an arbitrary base station is newly added as an active base station. Since the present invention relates to the process that a base station is newly added as an active base station, the explanation for the second embodiment is performed according to the pilot strength (P3) of the third base station to be an active base station. As described beforehand, the second embodiment uses, as the criterion element for determining the handoff, the parameter (T-PRANK) in addition to the parameters (T-ADD, T-DROP, T-TDROP, T-QUALITY) in the first embodiment. The value of T-PRANK is assumed 1.

First, at the time C1 in FIG. 4, the pilot strength (P3) of the third base station exceeds the value of the parameter (T-ADD). However, according to the parameter (T-QUALITY), since the forward link frame quality is good and the pilot strength (P3) of the third base station is smaller than the strength of the pilot whose strength is the T-PRANKth among the currently active base stations where T-PRANK is the value stored in the parameter (T-PRANK), the mobile station does not send the PSMM to the handoff control system. Instead, the mobile station moves the pilot for the third base station from the neighbor set to the candidate set. At the time C2, the pilot strength of the third base station measured by the mobile station exceeds the strength of the pilot of the active base station whose strength is the T-PRANKth where T-PRANK is the value stored in the parameter (T-PRANK) and exceeds the parameter (T-ADD). Therefore, even though the frame qualities of the forward link of the first and second active base stations are good when compared with the parameter (T-QUALITY), the mobile station sends the PSMM to the handoff control system. On the other hand, the handoff control system receives the PSMM from the mobile station and sends the handoff direction message to the mobile station at the time C3. The mobile station that received the handoff direction message turns the third base station as the candidate base station to a new active base station and then sends the handoff completion message to the handoff control system at the time C4.

On the other hand, as shown in FIG. 4, the pilot strength of the first active base station is decreased more and more as time passes. At the time C5, the strength is smaller than the parameter (T_DROP). After then, if the strength maintains the value smaller than the parameter (T_DROP) for the time (C5–C6) corresponding to the parameter (T-TDROP), the mobile station sends the PSMM to the handoff control system at the time C6. The handoff control system sends the mobile station the handoff direction message at the time C7. The mobile station that received the handoff direction message moves the pilot of the corresponding base station from the active base station to the neighbor base station and then sends the handoff completion message to the handoff control system at the time C8.

Figure 5:
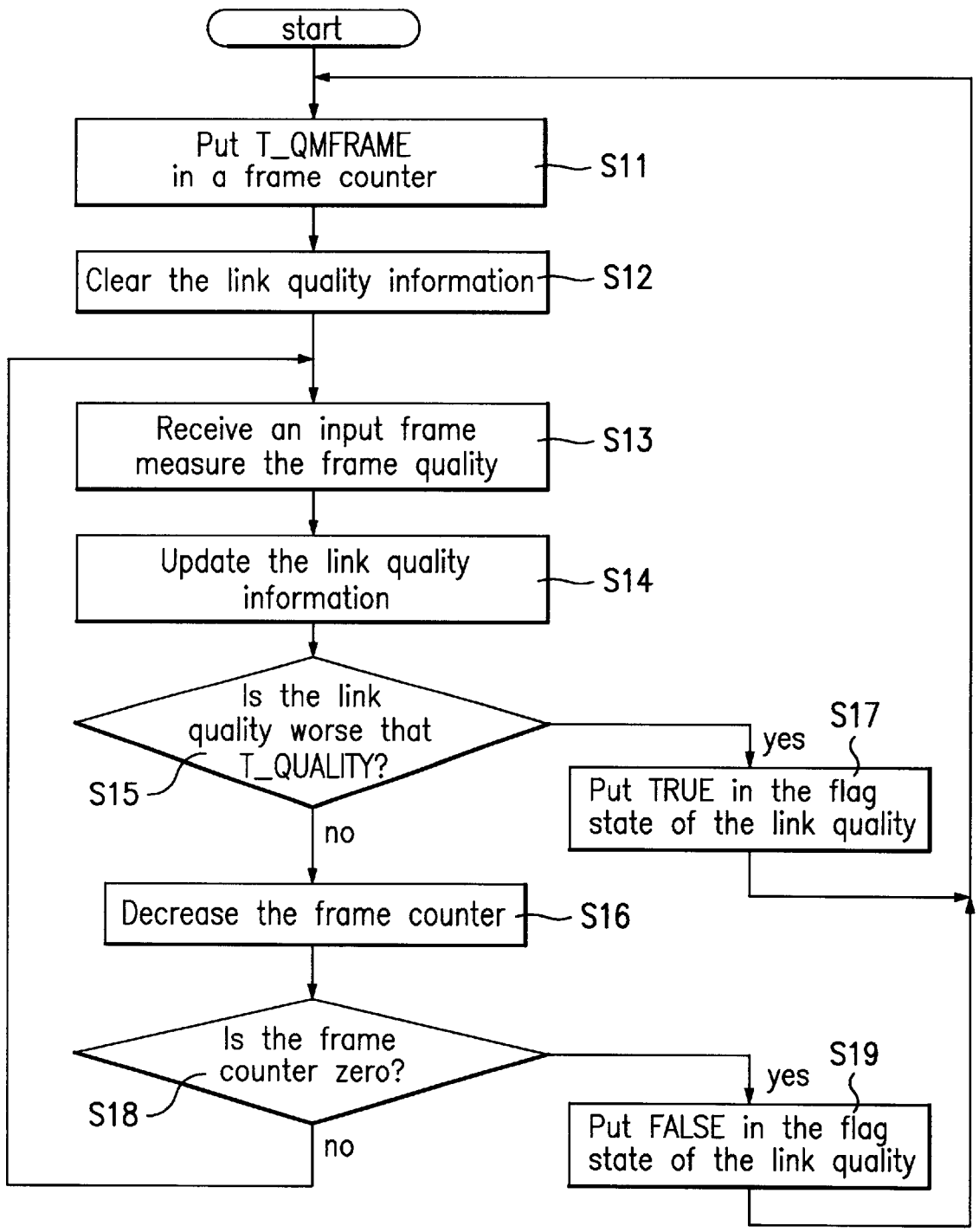
FIG. 5 is a flow chart showing the measuring process of the frame quality of the forward link using the parameter T_QUALITY according to the present invention.

FIG. 5 is a flow chart showing an exemplary embodiment of the process measuring the frame quality of the forward link.

FIG. 6 is a flow chart showing the process that the mobile station sends the PSMM to the handoff control system in order to add a communication path in the soft and softer handoff methods according to the present invention.

Referring to FIG. 5, the mobile station sets the frame counter with the parameter (T-QMFRAME) (S11) and clears the information about the frame quality which is stored in the mobile station. The mobile station receives a frame and measures the quality (S13). The mobile station updates the information about the frame quality of the forward link stored in itself (S14). The mobile station checks whether the updated frame quality of the link is worse than the parameter (T-QUALITY) (S15). As the result of said checking, if the frame quality of the link is worse than the parameter (T-QUALITY), the mobile station sets the bad flag state of the frame quality of the link with a logic true and then returns to the initial state (S11) (S17). As the result of said checking, if the frame quality of the link is not worse than the parameter (T-QUALITY), the mobile station decreases the number of the frame counter (S16) and then checks whether the frame counter is zero (S18). If the frame counter is zero, the mobile station sets the bad flag state of the frame quality of the link with a logic false and then returns to the initial state (S11) (S17). If the frame counter is not zero, the mobile station receives a frame and then returns to the step (S13) measuring the quality of the received frame. As above mentioned, FIG. 5 shows the process using the parameters (T-QUALITY, T-QMFRAME) which are the handoff decision elements.

Referring to FIG. 6, the active mobile station monitors periodically the pilots provided by the active, candidate, neighbor base stations, respectively, and measures the strength of the signals (S21). After then whenever the mobile station receives the frame of the forward link, the mobile station determines the quality of the forward link based on the received frames by using the flow chart in FIG. 5. The following step is to determine that the strength of a measured arbitrary pilot exceeds the parameter (T_ADD) (S22). As the result of the step (S22), when the pilot strength does not exceed the parameter (T_ADD), the mobile station decides whether the arbitrary base station is an active base station (S28). As the result of the step (S28), if the pilot belongs to the active base station, the mobile station executes the procedure (Soft/Softer Drop) releasing the communication path of the active base station in the same way as the conventional handoff method (S29). In this time, whether or not the pilot strength is smaller than the parameter (T-DROP) is determined. If the strength of the pilot is smaller than the parameter (T-DROP) and the pilot maintains the value smaller than the parameter (T-DROP) until the time memorized in the drop timer passes since the pilot goes to the value smaller than the parameter (T-DROP), the mobile station sends the PSMM to release the communication path of the active base station to the handoff control system. The time previously memorized in the drop timer is corresponding to the parameter (T-TDROP). However, as the result of the step (S28), if the pilot does not belong to the active base station, the mobile station executes the initial step (S21).

On the other hand, in the step (S22), when the measured pilot strength exceeds the parameter (T_ADD), the mobile station determines whether or not the measured pilot belongs to the active base station (S23). As the result of the step (23), if the measured pilot belongs to the active base station, the mobile station executes again the initial step (S21). On the contrary, if the pilot does not belong to the active base station, the mobile station determines which of the candidate, neighbor, and remaining base stations the pilot belongs to (S24). If the measured pilot belongs to the candidate base station, the mobile station executes the following step (S25). However, if the pilot belongs to the neighbor or remaining base station, the mobile station moves the measured pilot to the candidate set and then executes the following step (S25) (S24).

The mobile station checks whether the frame quality of the forward link is good (S25). If the frame quality of the forward link is worse than the parameter (T_QUALITY) like as it is at the time b2 in FIG. 3, or if the measured pilot strength is higher than the pilot whose strength is the T_PRANKth among the current active pilots (S26) (T_PRANK=1) like as it is at the time C2 in FIG. 4, the mobile station sends the handoff control system the PSMM to establish an additional communication path (S27). In other words, in FIG. 6, if one of the conditions for the two parameters (T_QUALITY, T_PRANK) is satisfied, the PSMM is sent to the handoff control system. If the frame quality of the forward link is good and the measured pilot strength is not higher than the strength of the active plot that has T-PRANK strength active pilot, the mobile station does not send the PSMM to the handoff control system and executes the initial step (S21).

If the mobile station sends the PSMM to the handoff control system and then receives the handoff direction message to establish the communication path from the handoff control system, the mobile station transfers the corresponding pilot to the active set and demodulates the signal received from the base station to which the corresponding pilot belongs. Furthermore, the mobile station sends the handoff completion message to the handoff control system. The mobile station repeats the above-described processes until the communication ends.

As described beforehand, the newly added parameter (T_QUALITY) in the present invention is a Forward link quality threshold. The parameter (T_PRANK) is a Threshold of pilot power rank. In the present invention, the roles of the parameters are explained in detail.

The parameter (T_QUALITY) is a threshold value for the frame quality of the forward link of the currently active base station that must be satisfied for the candidate, neighbor and remaining base stations, the pilot strength of each station exceeds the parameter (T_ADD), to be added to the set of active base station. This parameter is used to prohibit a new communication path from being added unnecessarily under the conditions that the quality of the currently operating wireless communication path is good.

Furthermore, the parameter (T_PRANK) is a threshold value that must be satisfied as compared with the pilot strengths of the currently active base stations for the candidate, neighbor remaining base stations, the pilot strength of each station exceeds the parameter (T_ADD), to be added to the active base stations. The operation of this parameter (T_PRANK) is determined by the application of the parameter (T_QUALITY).

If the parameter (T_QUALITY) is applied and the quality of the currently active wireless communication path is better than the parameter (T_QUALITY), even though the pilot signal strength of an arbitrary inactive base station exceeds the parameter (T_ADD) and has excellent quality, the inactive base station cannot be added to the set of active base stations. This situation is prohibited by the parameter (T_PRANK).

If the parameter (T_QUALITY) is not applied, the parameter (T_PRANK) together with the parameter (T_ADD) blocks a new communication path to being added unnecessarily.

Both of the parameters (T_QUALITY, T_PRANK) or one of the two parameters may be applied. Therefore, when a decision for transmitting the PSMM to the handoff control system is made, the condition of both parameters may be requested or the condition of one parameter may be requested. The selection of the conditions depends on the self decision of the communication network operator.

As described above, the present invention provides the following effects.

First, when a communication path is established by the soft/softer handoff method, the criterion condition is the absolute strength of the pilot and a special consideration is given to the quality of the current wireless communication path and to the relative strength of the pilot of the base station that will be added to the set of active base station to the pilots of the currently active base stations. Therefore, the unnecessary addition of new communication path may be blocked.

Second, by reducing the unnecessary handoff, the capacity of the communication system is increased.

Third, by prohibiting the add and release for the communication paths from frequently being repeated, the interference between the subscribers may be reduced. Furthermore, the deterioration of call quality caused by frequently signalling between the mobile station and the base station can be reduced and the load of the communication system can be reduced.

It will be apparent to those skilled in the art that various modifications and variations can be made in the handoff control method according to the present invention without departing from the spirit or scope of the invention. Thus, it is intended that the present invention covers the modifications and variations of this invention provided they come within the scope of the appended claims and their equivalents.

What is claimed is:

1. A method for controlling a handoff in a communication system, comprising:

(a) measuring a pilot strength of a base station by a mobile station and measuring a frame quality of a current forward link by the mobile station;

(b) checking whether said measured pilot strength is higher than a parameter (T-ADD) that is the threshold value of the pilot strength of said base station in which a new communication path is established, and checking whether said frame quality of the forward link is good as compared with a prescribed parameter (T—QUALITY) and determining whether the measured pilot strength is higher than a prescribed threshold value of a pilot power ranking, wherein the prescribed threshold value must be relatively satisfied as compared with a pilot strength of the base station; and (c) when said measured pilot strength is higher than said parameter (T-ADD) and said frame quality of the forward link is not good as compared with the prescribed parameter (T-QUALITY), in order to establish a new communication path, transmitting a pilot strength measurement message (PSMM) from said mobile station to a handoff control system through said base station.

2. The method claimed in claim 1, further comprising.

a step in which said handoff control system transmits a handoff direction message to said mobile station; and a step in which said mobile station receives said handoff direction message and changes said base station into a new active base station and then transmits a handoff completion message to said handoff control system.

3. The method claimed in claim 1, further comprising the step in which when said measured pilot strength is higher than said parameter (T-ADD) and said frame quality of the forward link is good, said mobile station does not send said PSMM to said handoff control system and changes said base station from a neighbor base station to a candidate base station.

4. The method claimed in claim 1, wherein said parameters (T-ADD, T-QUALITY) are sent from said handoff control system to said mobile station.

5. The method claimed in claim 1, further comprising:

when said measured pilot strength does not belong to a current active base station, checking whether said measured pilot strength belongs to a candidate base station;

when said measured pilot strength belongs to said candidate base station, checking whether said frame quality of the forward link is good; and when said measured pilot strength does not belong to said candidate base station, changing said base station into a candidate base station and then checking said frame quality of the forward link.

6. The method claimed in claim 1, further comprising:

when said measured pilot strength does not exceed said parameter (T-ADD), checking whether said measured pilot belongs to the currently active base station;

as the result of the checking step, when said measured pilot does not belong to the currently active base station, processing the step (a);

as the result of the checking step, when said measured pilot belongs to the currently active base station, checking whether the measured pilot strength is smaller than a threshold parameter (T-DROP) for releasing a communication path;

when the measured pilot strength is smaller than the threshold parameter (T-DROP), checking whether the situation is maintained for a parameter (T-TDROP) that is the time for releasing the communication path of the currently active base station; and if the situation that the measured pilot strength is smaller than the threshold parameter (T-DROP) is maintained for said parameter (T-TDROP), in order to release the communication path of said currently active base station, sending the PSMM from said mobile station to said handoff control system.

7. The method claimed in claim 6, wherein said handoff control system includes the step of sending the handoff direction message to said mobile station when the handoff control system receives the PSMM from said mobile station and wherein said mobile station that receives said handoff direction message includes the step of changing said active base station into a neighbor base station in order to release said communication path and the step of sending the handoff completion message to said handoff control system.

8. The method claimed in claim 1, wherein said parameter (T_QUALITY) that is the criterion element of the frame quality of said forward link is set according to at least one of the flame error rate (FER), the bit error rate (BER) and the symbol error rate (SER).

9. The method claimed in claim 1, wherein said parameter (T_QUALITY) that is the criterion element of the frame quality of said forward link is selectively applied by communication network operators.

10. The method claimed in claim 1, wherein the measurement of the frame quality of said forward link is periodically executed by the mobile station according to the parameter (T_QMFRAMES) that is a previously stored period.

11. The method claimed in claim 1, wherein the measurement of the frame quality of said forward link is executed by the mobile station according to the parameter (T_QMFRAMES) that is a previously stored period.

12. The method claimed in claim 1, wherein if the frame quality of the forward link is good as compared with the parameter (T-QUALITY), and the measured pilot strength is higher than both the parameter (T-ADD) and the threshold value of the pilot power ranking, then the PSMM is transmitted from the mobile station to the handoff control system.

13. A method for controlling a handoff in a communication system, comprising:
   (a) measuring the pilot strength of a base station by a mobile station and measuring the frame quality of a currently forward link by the mobile station;
   (b) checking whether said measured pilot strength is higher than the parameter (T-ADD) that is the threshold value of the pilot strength of said base station in which a new communication path is established and checking whether said frame quality of the forward link is good as compared with a preset parameter (T-QUALITY) and then checking whether said measured pilot strength is higher than the T_PRANKth strength where T_PRANK is the threshold value stored in the parameter (T_PRANK) that must be relatively satisfied as compared with the pilot strength of said currently active base station; and
   (c) according to the result of said step (b), sending a pilot strength measurement message from said mobile station to the handoff control system in order to establish a new communication path through said base station.

14. The method claimed in claim 13, as the result of said step (b), when the frame quality of the forward link is good as compared with said parameter (T-QUALITY) and said measured pilot strength is higher than said parameters (T-ADD, T-PRANK), sending said PSMM from said mobile station to said handoff control system.

15. The method claimed in claim 13, as the result of said step (b), when the frame quality of the forward link is not good as compared with said parameter (T-QUALITY) and said measured pilot strength is higher than said parameters (T-ADD, T-PRANK), sending said PSMM from said mobile station to said handoff control system.

16. The method claimed in claim 13, further comprising:
   if the PSMM is received, sending the handoff direction message from said handoff control system to said mobile station; and
   if said mobile station receives said handoff direction message, changing said base station into a new active base station by said mobile station and then sending a handoff completion message to said handoff control system.

17. The method claimed in claim 13, further comprising the step that when said measured pilot strength is higher than said parameter (T-ADD) and is smaller than the T-PRANKth strength among the pilot strengths of currently active base stations, where T-PRANK is stored in said parameter (T-PRANK) and said frame quality of the forward link is good as compared with said parameter (T-QUALITY), said mobile station does not send said PSMM to said handoff control system and changes the situation of said base station from the situation of a neighbor base station to the situation of a candidate base station.

18. The method claimed in claim 13, wherein said parameters (T-ADD, T-QUALITY, T-PRANK) is provided from said handoff control system to said mobile station.

19. The method claimed in claim 13, further comprising:
   when said measured pilot strength does not exceed said parameter (T-ADD), checking whether said measured pilot belongs to a currently active base station,
   as the result of said step of checking, when said measured pilot does not belong to a currently active base station, processing the step (a):
   as the result of said step of checking, when said measured pilot belongs to a currently active base station checking whether the measured pilot strength is smaller than the parameter (T-DROP) that is the threshold value to release the communication path;
   when the measured pilot strength is smaller than the parameter (T-DROP), checking whether the situation is maintained for a parameter (T-TDROP) that is the time for releasing the communication path of the currently active base station; and
   if the situation that the measured pilot strength is smaller than the parameter (T-DROP) is maintained for said parameter (T-TDROP) sending the PSMM from said mobile station to said handoff control system in order to release the communication path of the currently active base station.

20. The method claimed in claim 19, further comprising:
   when said handoff control system receives the PSMM from said mobile station sending the handoff direction message from said handoff control system to said mobile station; and
   changing said active base station into a neighbor base station through said mobile station that receives said handoff direction message in order to release said communication path and sending a handoff completion message to said handoff control system.

21. The method claimed in claim 13, wherein said parameter (T_QUALITY) that is the criterion element of the frame quality of said forward link is set according to at least one of the frame error rate (FER), the bit error rate (BER) and the symbol error rate (SER).

22. The method claimed in claim 13, wherein said parameter (T_QUALITY) that is the criterion element of the frame quality of said forward link is selectively applied by communication network operators.

* * * * *